United States Patent
Koebler

(10) Patent No.: US 11,591,996 B2
(45) Date of Patent: Feb. 28, 2023

(54) EMERGENCY START

(71) Applicant: Martin Koebler, Davidson, NC (US)

(72) Inventor: Martin Koebler, Davidson, NC (US)

(*) Notice: Subject to any disclaimer, the term of this patent is extended or adjusted under 35 U.S.C. 154(b) by 0 days.

(21) Appl. No.: 17/151,863

(22) Filed: Jan. 19, 2021

(65) Prior Publication Data

US 2021/0222661 A1    Jul. 22, 2021

Related U.S. Application Data

(60) Provisional application No. 62/962,807, filed on Jan. 17, 2020.

(51) Int. Cl.
| | | |
|---|---|---|
| *F02N 11/08* | (2006.01) | |
| *B60Q 9/00* | (2006.01) | |
| *H04W 4/80* | (2018.01) | |

(52) U.S. Cl.
CPC ............ *F02N 11/0862* (2013.01); *B60Q 9/00* (2013.01); *F02N 11/0807* (2013.01); *H04W 4/80* (2018.02)

(58) Field of Classification Search
CPC ............ F02N 11/0807; F02N 11/0862; F02N 11/0866; F02N 2300/304; B60Q 9/00; H04W 4/80
USPC ........................................... 123/179.2, 179.3
See application file for complete search history.

(56) References Cited

U.S. PATENT DOCUMENTS

| | | | | | |
|---|---|---|---|---|---|
| 5,793,185 | A | * | 8/1998 | Prelec | H02J 7/0042 320/104 |
| 5,955,866 | A | * | 9/1999 | Peng | H02J 7/342 320/105 |
| 5,982,138 | A | * | 11/1999 | Krieger | H02J 7/0042 320/105 |
| D495,993 | S | * | 9/2004 | Krieger | D13/107 |
| 7,134,415 | B2 | * | 11/2006 | Burke | F02N 11/0866 123/179.3 |
| 9,579,990 | B2 | * | 2/2017 | Butler | F02N 11/14 |
| 9,871,392 | B2 | * | 1/2018 | Durando | H02J 9/04 |
| 10,174,736 | B2 | * | 1/2019 | Zhang | F02N 11/14 |
| 10,400,732 | B2 | * | 9/2019 | Harvey | G06F 3/147 |
| 10,446,885 | B2 | * | 10/2019 | Clarke | G01R 31/3835 |
| D881,811 | S | * | 4/2020 | Koebler | D13/119 |
| 10,697,417 | B2 | * | 6/2020 | Koenen | F02N 11/0866 |
| 11,136,956 | B2 | * | 10/2021 | Gilpatrick | F02N 11/0862 |
| D938,441 | S | * | 12/2021 | Nook | D14/485 |
| 2009/0056661 | A1 | * | 3/2009 | Cook | F02N 11/0866 123/179.3 |
| 2013/0213336 | A1 | * | 8/2013 | Solberg | F02N 11/0866 123/179.3 |
| 2014/0375067 | A1 | * | 12/2014 | Yang | H02J 1/108 290/38 R |
| 2016/0126765 | A1 | * | 5/2016 | Marini | H02J 7/007192 320/139 |

(Continued)

*Primary Examiner* — Phutthiwat Wongwian
*Assistant Examiner* — Arnold Castro
(74) *Attorney, Agent, or Firm* — Thomas M. Joseph, Esq

(57) ABSTRACT

An improved method and apparatus for powering an electric motor for starting an internal combustion engine in which the electric motor is in a 6 volt to 48 volt operating system, in which an auxiliary battery pack has a battery pack housing; at least one lithium-based rechargeable cell within the housing; associated means for receiving a radio transmitted signal; associated means for turning the rechargeable cell ON or OFF; and battery connections for connecting the auxiliary battery pack to a battery in a 6 volt to 48 volt operating system.

19 Claims, 5 Drawing Sheets

(56) References Cited

U.S. PATENT DOCUMENTS

| | | | | |
|---|---|---|---|---|
| 2016/0185225 A1* | 6/2016 | Namuduri | ............ | B60L 15/2054 |
| | | | | 701/22 |
| 2016/0268645 A1* | 9/2016 | Koebler | ................ | H01M 50/20 |
| 2016/0285258 A1* | 9/2016 | Wu | ......................... | H02H 3/087 |
| 2016/0288651 A1* | 10/2016 | Kinoshita | ................ | B60L 58/20 |
| 2016/0288652 A1* | 10/2016 | Suzuki | ................ | F02N 11/0866 |
| 2016/0290305 A1* | 10/2016 | Kinoshita | ............ | F02N 11/0866 |
| 2017/0102116 A1* | 4/2017 | Sherry | .................... | G03B 15/02 |
| 2017/0110766 A1* | 4/2017 | Koebler | ............ | H01M 10/0525 |
| 2017/0317492 A1* | 11/2017 | Koebler | ................ | H01R 11/24 |
| 2017/0346934 A1* | 11/2017 | Dentamaro | ........ | H04M 1/72412 |
| 2018/0072300 A1* | 3/2018 | Jang | ......................... | H02J 7/34 |
| 2018/0269703 A1* | 9/2018 | Nook | .................... | H01M 50/543 |
| 2018/0351383 A1* | 12/2018 | Zeiler | .................... | H02J 7/1461 |
| 2019/0184971 A1* | 6/2019 | Kim | ...................... | F02N 15/006 |
| 2019/0198833 A1* | 6/2019 | Le | ......................... | H01M 10/06 |
| 2019/0238960 A1* | 8/2019 | Cheney | .................... | H02J 7/025 |
| 2019/0386473 A1* | 12/2019 | Kawashita | .......... | H01R 13/5202 |
| 2020/0028368 A1* | 1/2020 | Nook | .................... | H02J 7/0021 |
| 2020/0072177 A1* | 3/2020 | Clarke | .................... | H02J 7/342 |
| 2020/0086732 A1* | 3/2020 | Bargman | ................ | B60K 6/48 |
| 2020/0169114 A1* | 5/2020 | Almeida | ............ | B60R 16/0238 |
| 2021/0222661 A1* | 7/2021 | Koebler | ............. | F02N 11/0862 |
| 2021/0239084 A1* | 8/2021 | Koebler | ............. | F02N 11/0807 |
| 2021/0313824 A1* | 10/2021 | Miyabe | ............... | H02J 7/00047 |

\* cited by examiner

EMERGENCY START

CROSS REFERENCE TO RELATED APPLICATION

This application claims the benefit of priority of U.S. Provisional Patent Application Ser. No. 62/962,807, filed Jan. 17, 2020.

FIELD OF THE INVENTION

The present invention relates to a method and apparatus capable of jump starting a wide variety of vehicles powered by internal combustion.

BACKGROUND OF THE INVENTION

The invented IONIC permanent mounted "Emergency Start" is capable of jump starting a wide variety of vehicles powered by internal combustion engines, including cars, trucks, SUVs and boats with engine sizes up to 7.2 L (gas) and 4.0 L (diesel); as well as power sport vehicles, 4-cylinders, V6, V8 and V10 engines.

Vehicle and boat engine batteries are heavy, bulky, and have short cycle life, short calendar life, and low turn around efficiency. Ordinary lead-acid batteries also have a high internal impedance (resistance) that is greater in cold weather making it more difficult to start an IC engine in cold weather with less current available.

SUMMARY OF THE INVENTION

The invented Emergency Start apparatus is mounted on the top or side of a vehicle-starting battery or other location near the battery, and is intended to remain in place for emergency use. Whenever a jumpstart is required, a simple long-press on the unit's function button turns on the unit and starts the vehicle. Smartphone technology also allows the functions of the Emergency Start to be accessed from the safety of inside the vehicle, via a downloaded APP.

OBJECT OF THE INVENTION

The principal object of the present invention is to provide an improved method and apparatus for providing a charge through a dead or weak battery to an internal combustion engine or electric motor.

BRIEF DESCRIPTION OF THE DRAWINGS

The foregoing and other objects will become more readily apparent by referring to the following detailed description and the appended drawings in which.

DETAILED DESCRIPTION

Figure 1:
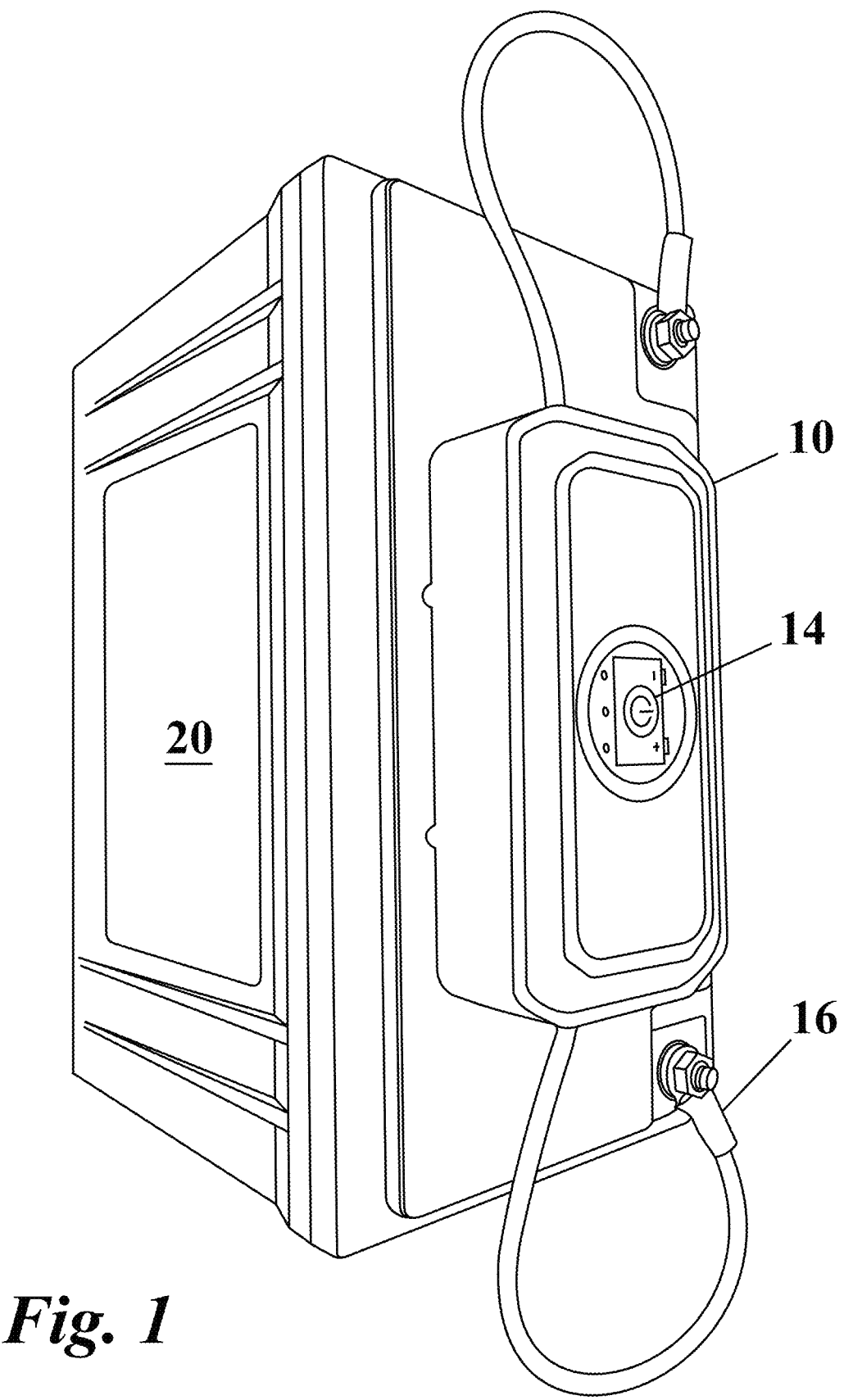
FIG. 1 is an isometric view of the invented emergency start apparatus mounted on a 12v battery.
Figure 2:
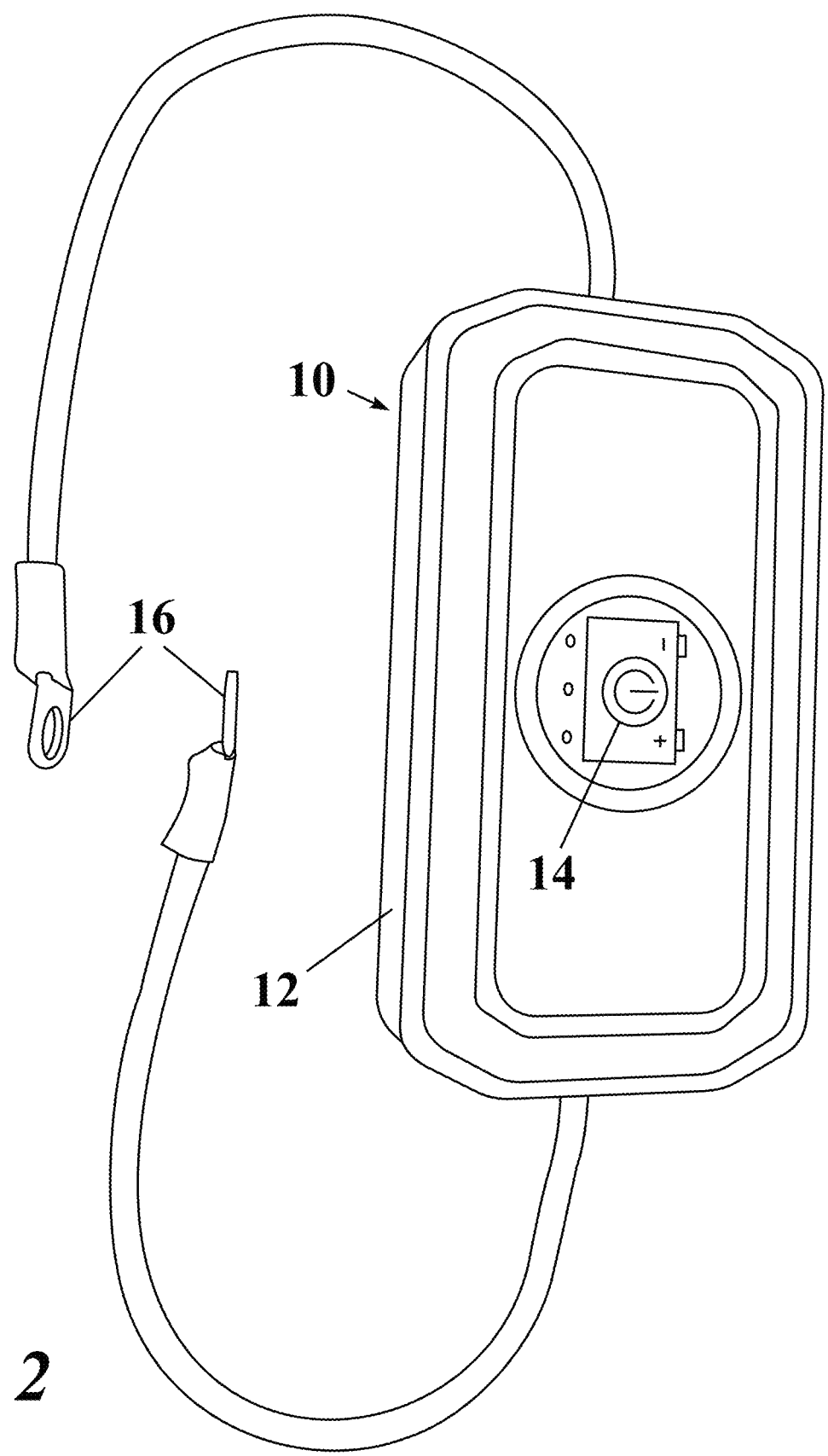
FIG. 2 is an isometric view of the invented emergency start apparatus.

Referring now to the drawings, auxiliary battery pack unit 10 for powering an electric motor for starting an internal combustion engine in which the electric motor is in a 6 volt to 48 volt operating system, comprises a battery pack housing 12, at least one lithium-based rechargeable cell within the housing, means incorporated within the housing for receiving a signal to turn the cell ON or OFF, associated means such as ON-OFF button 14 for turning the rechargeable cell ON or OFF, and battery connections 16 for connecting the auxiliary battery pack 10 to a battery 20 in a 6 volt to 48 volt operating system. The battery pack unit can be provided with associated means for receiving a radio transmitted signal for operating the battery pack. The ON-OFF button can be operated manually, but preferably, it is operated by a smartphone, using Bluetooth technology.

Features of the invented Emergency Start apparatus are:

Bluetooth technology and a specialized smartphone app provide the ability to jumpstart a car without ever leaving the safety of the driver's seat.

The Ionic Battery's smartphone app is user friendly.

The Emergency Start unit gives the user the safety of not be stranded with a dead battery anywhere.

The invented Emergency Start unit is charged by the vehicle charging system in which it is installed.

The Emergency Start unit includes an auto-detect disconnect from the vehicle drain.

The Emergency Start unit is usable on automobiles, trucks, SUV's, ATV's, boats and other items having battery-started engines.

The Emergency Start unit works on engines up to 7.2 L V8 and small diesels (4.0 MAX).

The Emergency Start unit may be permanently mounted on the vehicle's starter battery. Yet, it is easy to remove to and install on another vehicle, if desired.

The Emergency Start unit stays fully charged and is ready to assist the battery whenever needed. It allows the user to jumpstart his vehicle manually by pressing the Start button, or by Bluetooth operation from a smartphone.

The Emergency Start unit 10 is provided with a waterproof exterior housing or case 12.

Figure 3:
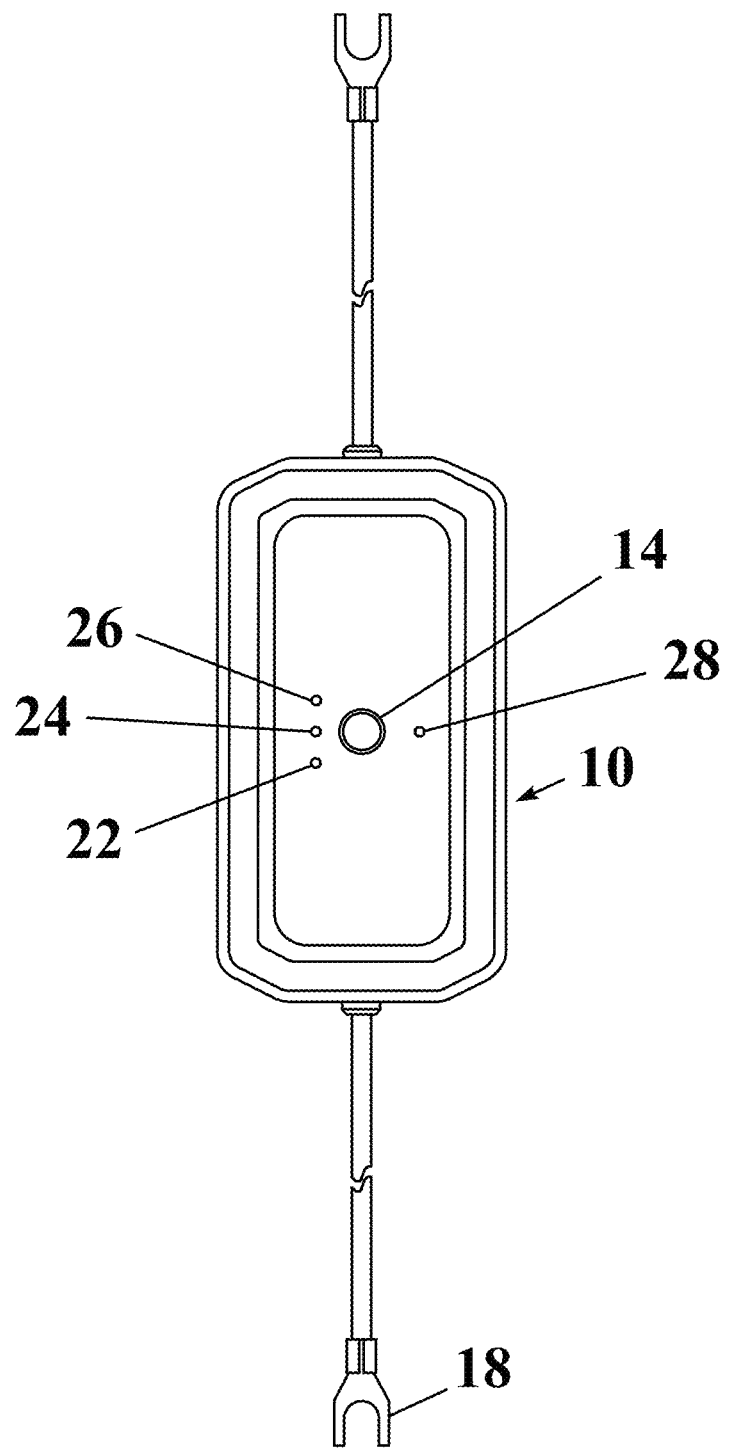
FIGS. 3 and 4 are front views of the invented emergency start apparatus.
Figure 4:
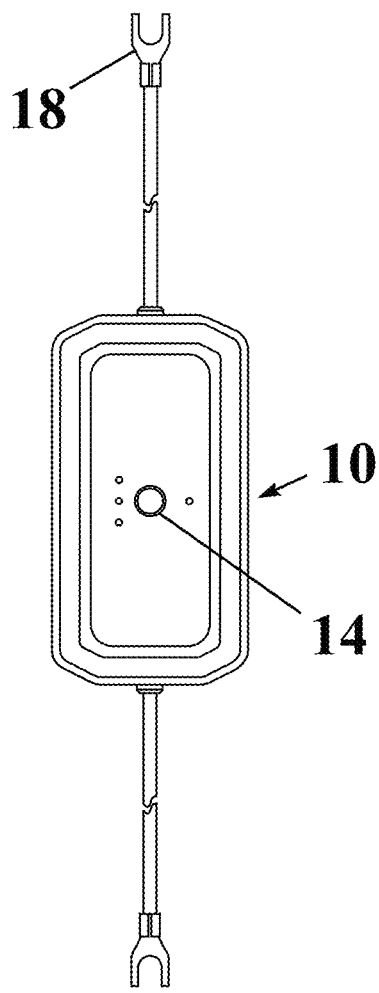
Figure 5:
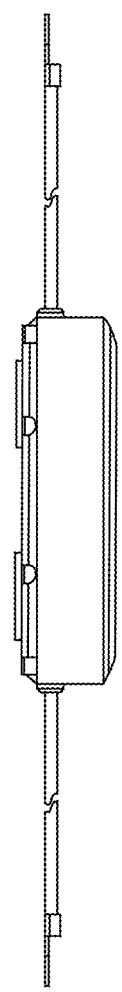
FIG. 5 is a left side view of the invented emergency start apparatus, the right side view being a mirror image thereof.
Figure 6:
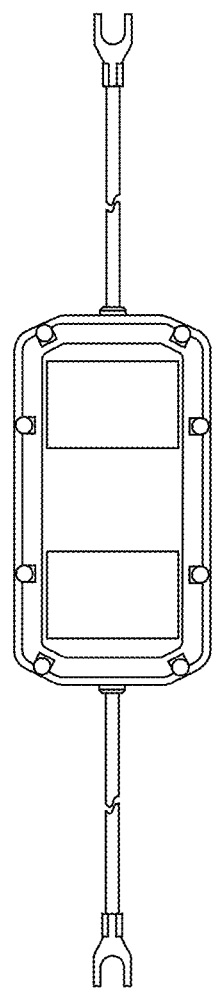
FIG. 6 is a rear view of the invented emergency start apparatus.
Figure 7:
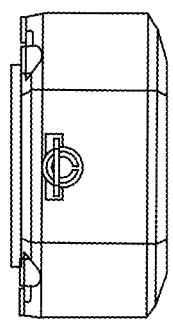
FIG. 7 is a top end view of the invented emergency start apparatus, the bottom end view being the same.
Figure 8:
FIG. 8 is a detailed top view of the invented emergency start device controls utilizing an APP with a display showing the device in the OFF mode.
Figure 9:
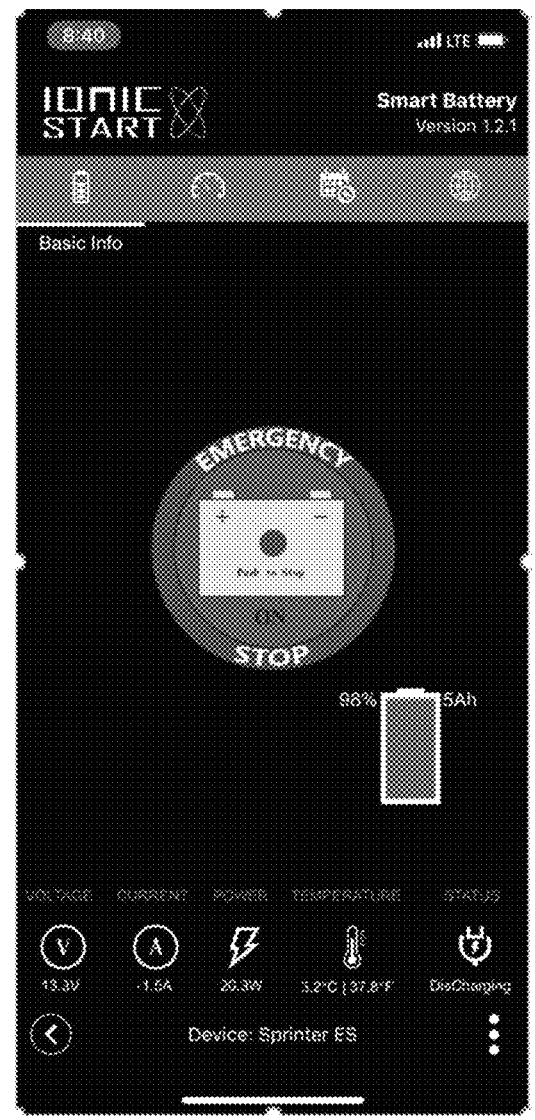
FIG. 9 is a detailed top view of the invented emergency start device controls utilizing an APP with a display showing the device in the ON mode.

Referring to FIGS. 3, 8, and 9, the following features appear on the Emergency Start Unit as indicated by the reference numerals:

1) Function button 14: Short press displays Battery Level as shown in FIGS. 8 and 9. Long Press activates START.

2) BlueTooth Status LED lights 22, 24, and 26 indicate the battery level.

3) If Battery Level LED 22 is lit—Low

4) If Battery Level LED 24 is lit—Medium

5) If Battery Level LED 26 is lit—Full

6) Indicator light 28 indicated Bluetooth usage by turning blue, and indicates that there is an error in the system by turning red.

7) Battery connections are permanent, being ring terminals 16 or spade connectors 18, or other firm connector, but not clamps.

The Emergency Start unit is charged by a vehicle charging system. However, it may optionally be charged by a charger such as ionic 12V 4 A charger to charge the Emergency Start. Note that a full charge or recharge of the unit should take less than 30 minutes, depending the on vehicle charging system. It is recommended that the unit be charged every 6 months for optimum performance.

From an APP, the attached battery pack can be turned ON or OFF, monitor battery charge level, monitor battery voltage, monitor battery current, monitor power level, monitor temperature, monitor cycle life, monitor status (charging, discharging, standby), display error message for (High Voltage, Low Voltage, Over current Charging, Over current Discharging, Low Temperature charging, Low temperature discharging, High Temperature Charging, High Temperature Discharging.

The Emergency Starter can be activated either by long pressing the START button or with the "Ionic Red Batteries" APP. When activating by long pressing the START button, the LED lights on the Emergency Start will start blinking rapidly, indicating cables are active and ready to start the engine. When activating the Emergency Starter by the APP, the procedure is to open the APP, "Ionic Red Batteries", and press on the circular "Start" button. The circular button will turn green that will allow the operator to start your engine. The LED lights on the Emergency Start will start blinking rapidly, indicating cables are active and ready to start the engine.

The Emergency Start unit will stay active until a discharge voltage of 13.6V is reached. When reactivating the unit again by repressing the circular button the Emergency Start will stay ON until the Emergency Start battery is fully discharged at ~10V. An engine start attempt can be made during any time when the unit is active.

Any time a charging system is charging, such as from vehicle alternator the Emergency Start unit will turn ON to receive a charge.

The Emergency Start unit disconnects itself automatically from the vehicle battery system when the battery voltage drops below 13.6V, keeping the Emergency Starter at full charge and to prevent the Emergency Start from discharging.

From APP, the attached Emergency Start battery pack can be turned ON or OFF, monitor battery charge level, monitor battery voltage, monitor battery current, monitor power level, monitor temperature, monitor cycle life, monitor status (charging, discharging, standby), and display error message for High Voltage, Low Voltage, Over current Charging, Over current Discharging, Low Temperature charging, Low temperature discharging, High Temperature Charging, and High Temperature Discharging.

It should noted that the Emergency Start unit does not have to be connected directly to the vehicle battery. It can be connected to the vehicle 12V system used for starting engines, but otherwise works as described above.

SUMMARY OF THE ACHIEVEMENT OF THE OBJECTS OF THE INVENTION

From the foregoing, it is readily apparent that I have invented an improved method and apparatus for providing a charge through a dead or weak battery to an internal combustion engine or electric motor faster and more economically than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A battery pack for powering an electric motor for starting an internal combustion engine in which the electric motor is in a 6 volt to 48 volt operating system, said battery pack comprising:
    a battery pack housing;
    at least one lithium-based rechargeable cell, within said housing, for storing power for the battery pack, so that the battery pack has, at least, sufficient charge to start the electric motor and to supply power thereto;
    associated means for turning the rechargeable cell ON or OFF within said housing; and
    battery connections for connecting said battery pack to a 6 volt to 48 volt operating system;
    wherein the associated means for turning the rechargeable cell ON or OFF turns the at least one rechargeable cell ON, so that the battery pack starts the electric motor and supplies power thereto.

2. A battery pack according to claim 1, further comprising:
    associated means for receiving a radio transmitted signal being positioned within said housing, at least partially, and being coupled to associated means for turning the rechargeable cell ON or OFF; and
    remote means for turning the battery pack on or off remotely communicating with associated means for receiving a radio transmitted signal.

3. A battery pack according to claim 2 wherein said remote means is a computer APP residing on a device selected from the group consisting of a smartphone and a tablet.

4. A battery pack according to claim 2 wherein said remote means is selected from the group consisting of a Blue Tooth, Wifi and GSM, GPRS, EDGE, and UMTS/HSPA.

5. A battery pack according to claim 4, further comprising means for visually displaying the BlueTooth status.

6. A battery pack according to claim 1 wherein said battery connections are permanent.

7. A battery pack according to claim 1 wherein said battery connections are ring terminals or spade connectors.

8. A battery pack according to claim 1 wherein the housing includes a plurality of LED lights for indicating the signal connection strength.

9. A battery pack according to claim 8 wherein the plurality of LED lights blink to indicate that the battery pack is active and is ready to start the internal combustion engine.

10. A battery pack according to claim 1 wherein the housing having an indicator light for visually displaying signal connection status thereon, and
    wherein the indicator light has the ability to change colors to indicate an error in the operation of the battery pack.

11. A battery pack according to claim 1, further comprising:
    a long press for activating associated means for turning the rechargeable cell ON or OFF.

12. A battery pack according to claim 1, wherein the battery pack housing, the electric motor, the internal combustion engine, and the 6 volt to 48 volt operating system are mounted in a vehicle for driving;
    wherein the associated means for turning the rechargeable cell ON or OFF turns the rechargeable cell ON to start the vehicle; and
    wherein the rechargeable cell provides a constant voltage to the electric motor while the vehicle is being driven.

13. A battery pack for powering an electric motor for starting an internal combustion engine in which the electric motor is in a 6 volt to 48 volt operating system, said battery pack comprising:

a waterproof battery pack case having an indicator light for visually displaying signal connection status thereon;

at least one lithium-based rechargeable cell, within said case, for storing power for the battery pack, so that the battery pack has, at least, sufficient charge to start the electric motor and to supply power thereto;

associated means for turning the rechargeable cell ON or OFF within said case; and battery connections for connecting said battery pack to a 6 volt to 48 volt operating system;

wherein the associated means for turning the rechargeable cell ON or OFF turns the at least one rechargeable cell ON, so that the battery pack starts the electric motor and supplies power thereto.

14. A battery pack according to claim 13 wherein the housing includes a plurality of LED lights for indicating the signal connection strength.

15. A battery pack according to claim 14 wherein the plurality of LED lights blink to indicate that the battery pack is active and is ready to start the internal combustion engine.

16. A battery pack according to claim 13, further comprising:

associated means for receiving a radio transmitted signal being positioned within said case, at least partially, and being coupled to associated means for turning the rechargeable cell ON or OFF; and remote means for turning the battery pack on or off remotely communicating with associated means for receiving a radio transmitted signal.

17. A battery pack according to claim 13, further comprising:

a long press for activating associated means for turning the rechargeable cell ON or OFF.

18. A battery pack according to claim 13, wherein the waterproof battery pack case, the electric motor, the internal combustion engine, and the 6 volt to 48 volt operating system are mounted in a vehicle for driving wherein the associated means for turning the rechargeable cell ON or OFF turns the rechargeable cell ON to start the vehicle; and wherein the battery pack provides a constant voltage to the electric motor while the vehicle is being driven.

19. A battery pack for powering an electric motor for starting an internal combustion engine in which the electric motor is in a 6 volt to 48 volt operating system, said battery pack comprising:

an emergency battery pack;

at least one lithium-based rechargeable cell for supply power to the battery pack, so that the battery pack has sufficient charge to start the electric motor;

associated means for turning the rechargeable cell ON or OFF; and battery connections for connecting said emergency battery pack to a 6 volt to 48 volt operating system;

wherein associated means for turning the rechargeable cell ON or OFF turns the rechargeable cell ON, so that the battery pack starts the electric motor and powers the electric motor.

* * * * *